US011980577B2

(12) United States Patent
Mauro

(10) Patent No.: US 11,980,577 B2
(45) Date of Patent: May 14, 2024

(54) MOTORIZED ACCESSORY FOR A WHEELCHAIR

(71) Applicant: Edward Mauro, Oldsmar, FL (US)

(72) Inventor: Edward Mauro, Oldsmar, FL (US)

( * ) Notice: Subject to any disclaimer, the term of this patent is extended or adjusted under 35 U.S.C. 154(b) by 433 days.

(21) Appl. No.: 17/232,976

(22) Filed: Apr. 16, 2021

(65) Prior Publication Data

US 2021/0322234 A1 Oct. 21, 2021

Related U.S. Application Data

(60) Provisional application No. 63/010,735, filed on Apr. 16, 2020.

(51) Int. Cl.
*A61G 5/04* (2013.01)
*A61G 5/10* (2006.01)

(52) U.S. Cl.
CPC .......... *A61G 5/047* (2013.01); *A61G 5/1051* (2016.11); *A61G 2203/10* (2013.01)

(58) Field of Classification Search
CPC ... A61G 5/047; A61G 5/1051; A61G 2203/10
See application file for complete search history.

(56) References Cited

U.S. PATENT DOCUMENTS

| | | | | |
|---|---|---|---|---|
| 6,896,079 | B1 | 5/2005 | Axelsson | |
| 7,694,991 | B2 | 4/2010 | Mills et al. | |
| 7,976,049 | B2 * | 7/2011 | Chiu | A61G 5/047 180/13 |
| 8,434,775 | B2 | 5/2013 | Patmont et al. | |
| 9,757,290 | B1 | 9/2017 | Scognamiglio | |
| 10,857,046 | B2 * | 12/2020 | Kim | A61G 5/047 |
| 10,888,474 | B2 * | 1/2021 | Kim | A61G 5/047 |
| 2004/0000440 | A1 | 1/2004 | Sawyer | |
| 2011/0095508 | A1 * | 4/2011 | Chiu | A61G 5/047 280/304.1 |
| 2011/0101642 | A1 * | 5/2011 | Chiu | A61G 5/047 280/304.1 |
| 2015/0351979 | A1 | 12/2015 | Conte | |
| 2018/0147100 | A1 * | 5/2018 | Conte | A61G 5/1035 |
| 2019/0015272 | A1 * | 1/2019 | Benedini | A61G 5/1051 |
| 2019/0380893 | A1 * | 12/2019 | Kim | A61G 5/1051 |
| 2020/0000658 | A1 * | 1/2020 | Klein | A61G 5/047 |
| 2021/0212870 | A1 * | 7/2021 | Hodsdon | B62K 11/02 |
| 2021/0228427 | A1 * | 7/2021 | Srinivasan | A61G 5/047 |
| 2022/0117807 | A1 * | 4/2022 | Choi | B60L 50/60 |

* cited by examiner

*Primary Examiner* — Minnah L Seoh
*Assistant Examiner* — Ryan Edward Hardy
(74) *Attorney, Agent, or Firm* — ALLEN, DYER, ET AL.

(57) ABSTRACT

A motorized accessory for a wheelchair includes a housing having a top end and a bottom end, a handlebar assembly secured to the top end of the housing, and a wheel assembly coupled to the lower end of the housing. The motorized accessory also includes an electric motor coupled to the wheel assembly that is configured to drive the wheel assembly. In addition, the motorized accessory includes a tow bar assembly having a proximal end coupled to the housing and extending outward to a free distal end, where the free distal end is configured to be removably coupled to the wheelchair. The motorized accessory is configured to latch to the manually driven wheelchair in order to convert the manually driven wheelchair into a motorized wheelchair.

17 Claims, 8 Drawing Sheets

MOTORIZED ACCESSORY FOR A WHEELCHAIR

RELATED APPLICATIONS

The present invention claims priority to Provisional Patent Application Ser. No. 63/010,735 filed Apr. 16, 2020, the entire contents of thereof incorporated herein by reference.

FIELD

The present invention relates to the field of wheelchairs, and, more particularly, to a motorized accessory for a wheelchair and related methods.

BACKGROUND

The use of wheelchairs by the disabled and injured has been used for many years. The wheelchair can be pushed by someone from behind, or the person can use their hands to rotate the wheels to move. There have been attempts to motorize wheelchairs to make it easier for the person to not have to expend energy to manually turn the wheels themselves. These types of motorized wheelchairs typically have some type of joystick to control an electric motor powered by a battery pack stored under the wheelchair.

However, these motorized wheelchairs are much more expensive than a manual wheelchair. In addition, motorized wheelchairs are heavy and cumbersome. Accordingly, there is a need in the art for a wheelchair that is motorized but inexpensive to manufacture and operate.

SUMMARY

In view of the foregoing background, it is therefore an object of the present invention to provide an inexpensive accessory to motorize manual wheelchairs. This and other objects, features, and advantages in accordance with the present invention are provided by a motorized accessory for a wheelchair that includes a housing having a top end and a bottom end, a handlebar assembly secured to the top end of the housing, and a wheel assembly coupled to the lower end of the housing. The motorized accessory also includes an electric motor coupled to the wheel assembly that is configured to drive the wheel assembly. In addition, the motorized accessory includes a tow bar assembly having a proximal end coupled to the housing and extending outward to a free distal end, where the free distal end is configured to be removably coupled to the wheelchair. The motorized accessory is configured to latch to the manually driven wheelchair to convert the manually driven wheelchair into a motorized wheelchair.

The handlebar assembly of the motorized accessory may include a first handgrip and an opposing second handgrip that are configured to be grasped by a user to turn the wheel assembly. The handlebar assembly may also include a speed control lever and a brake lever.

In a particular aspect, the wheel assembly may have a single wheel and a battery may be secured within the housing and coupled to the electric motor to drive the wheel. The wheel assembly may also include a brake assembly.

When not being coupled to a wheelchair, a kickstand of the motorized accessory may be used to support the housing in an upright position when not coupled to the wheelchair.

The proximal end of the tow bar assembly may include a collar to couple the tow bar assembly to the housing, and the distal end of the tow bar assembly has a tow bar to couple to the wheelchair. The tow bar assembly may also include a latch for removably coupling the proximal end and the distal end of the tow bar assembly together. A clamp of the tow bar assembly may be used to secure a middle portion of the tow bar to the latch.

The tow bar itself includes a first free end and a second free end extending laterally from the middle portion outward in opposite directions and having a wheelchair clamp on each of the free ends. The wheelchair clamps are configured to be secured to the wheelchair so that the motorized accessory can tow the wheelchair.

DETAILED DESCRIPTION

Figure 1:
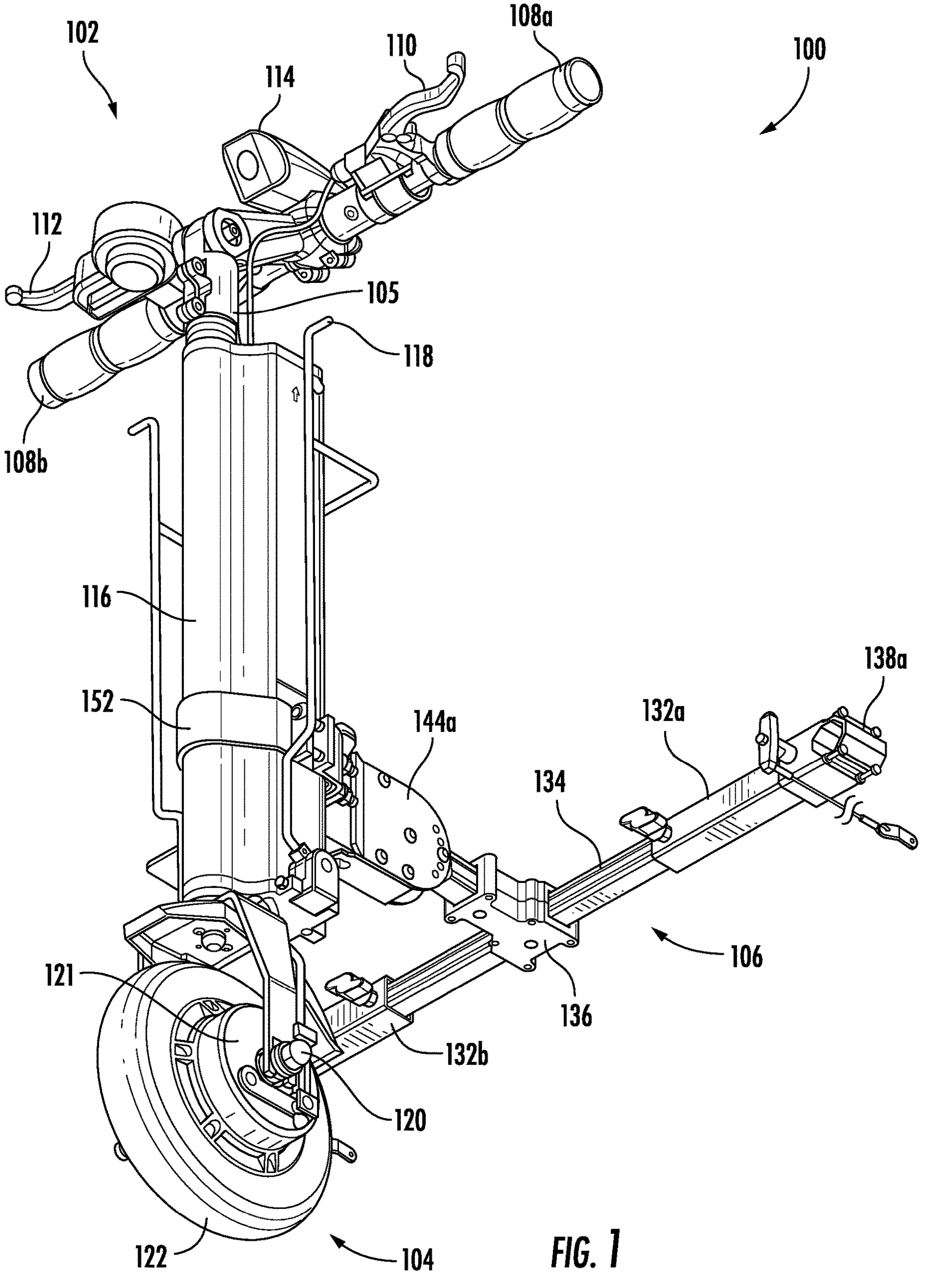
FIG. 1 is a left side perspective view of a motorized wheelchair accessory in which various aspects of the disclosure may be implemented.
Figure 2:
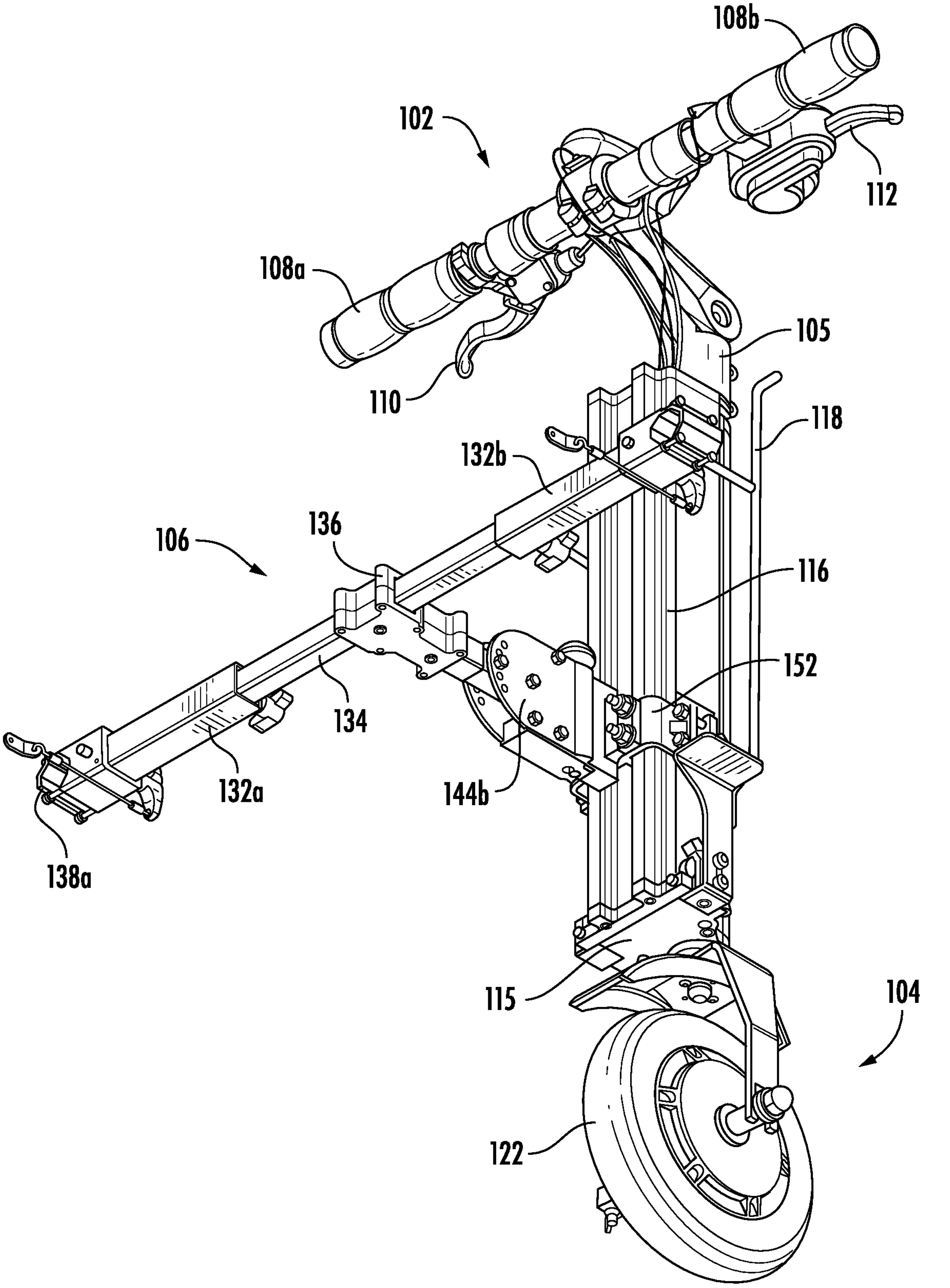
FIG. 2 is a right side perspective view of the motorized wheelchair accessory of FIG. 1.
Figure 3:
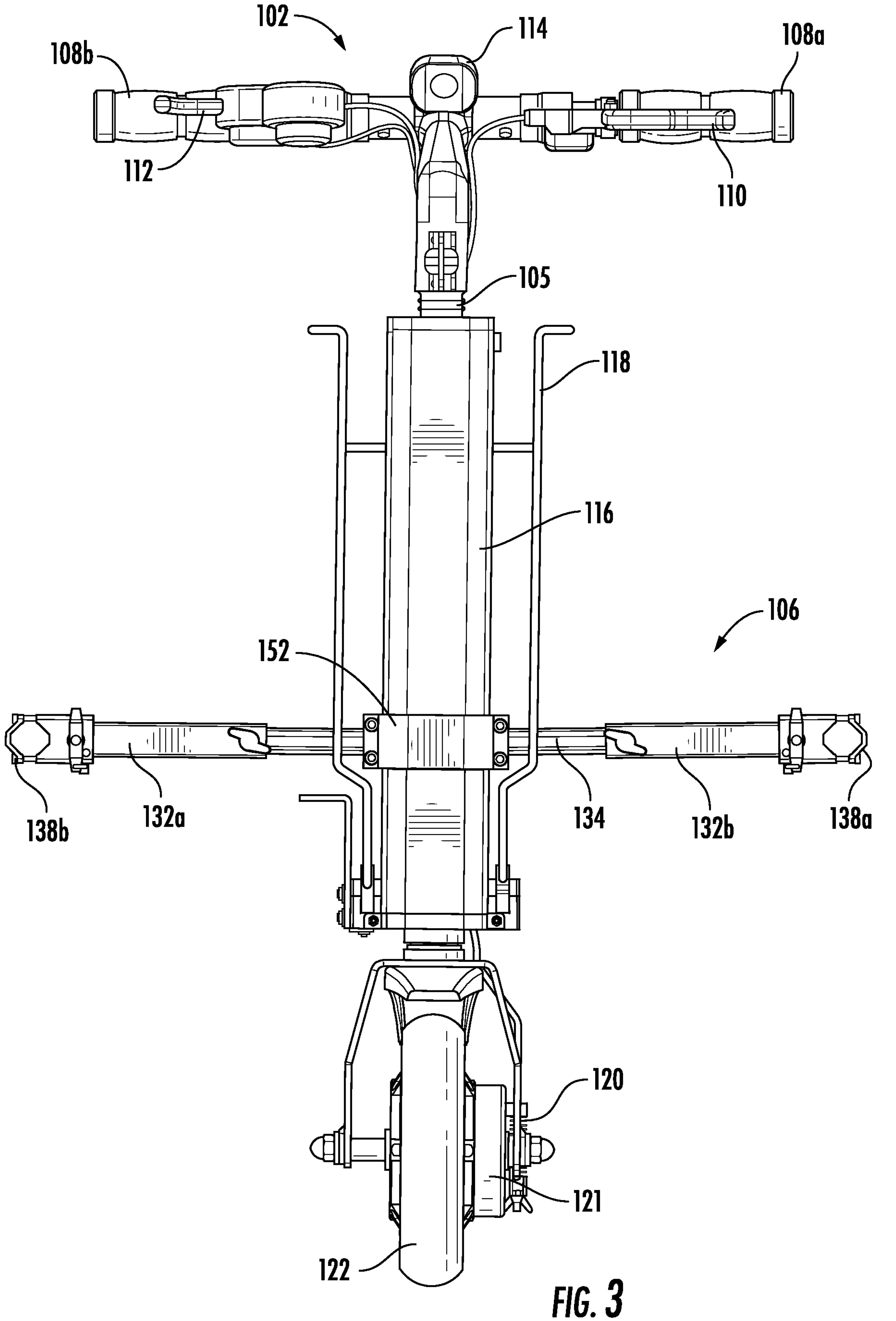
FIG. 3 is a front view of the motorized wheelchair accessory of FIG. 1.
Figure 4:
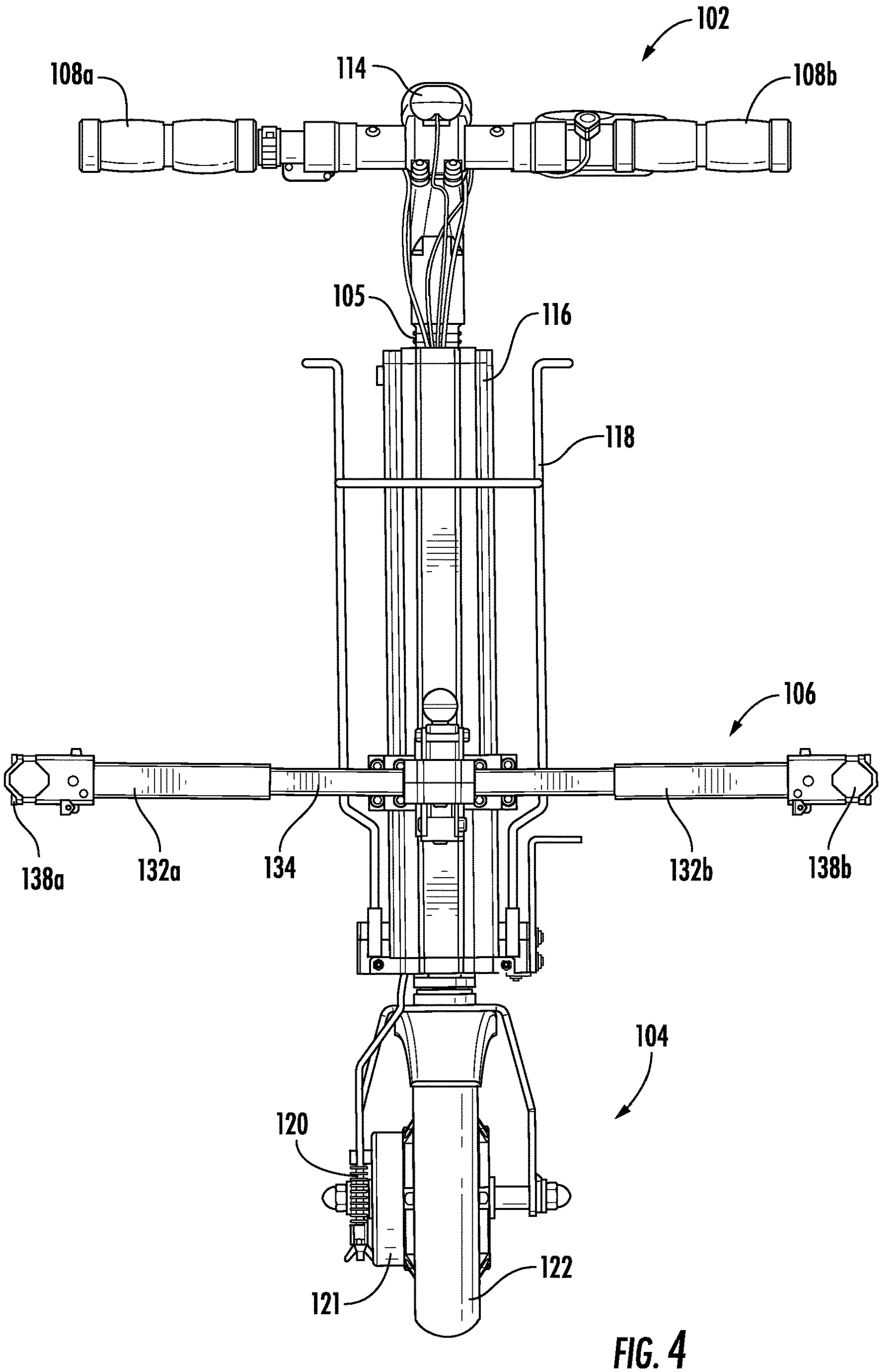
FIG. 4 is a rear view of the motorized wheelchair accessory of FIG. 1.
Figure 5:
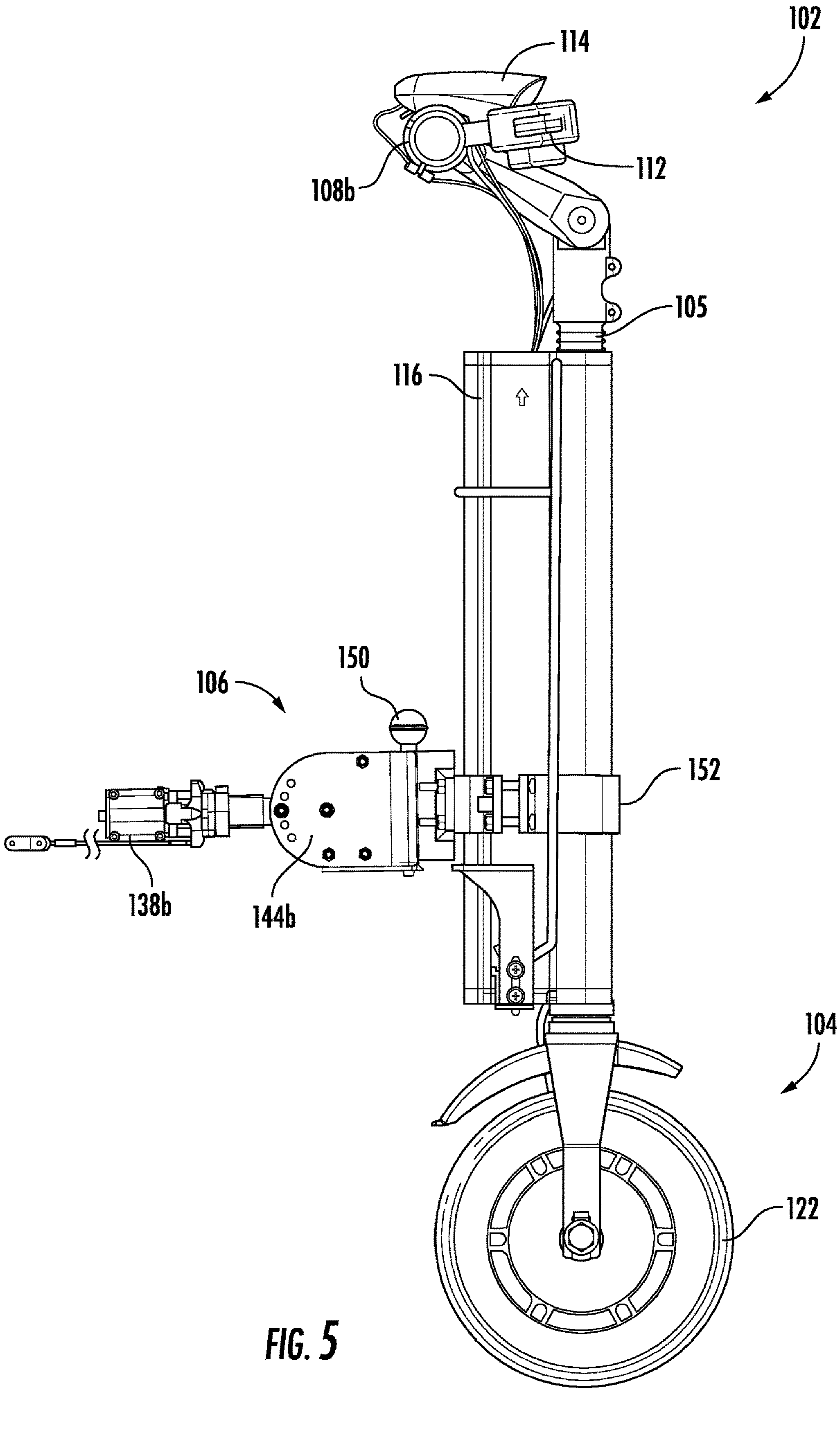
FIG. 5 is an elevational view of the motorized wheelchair accessory of FIG. 1.
Figure 6:
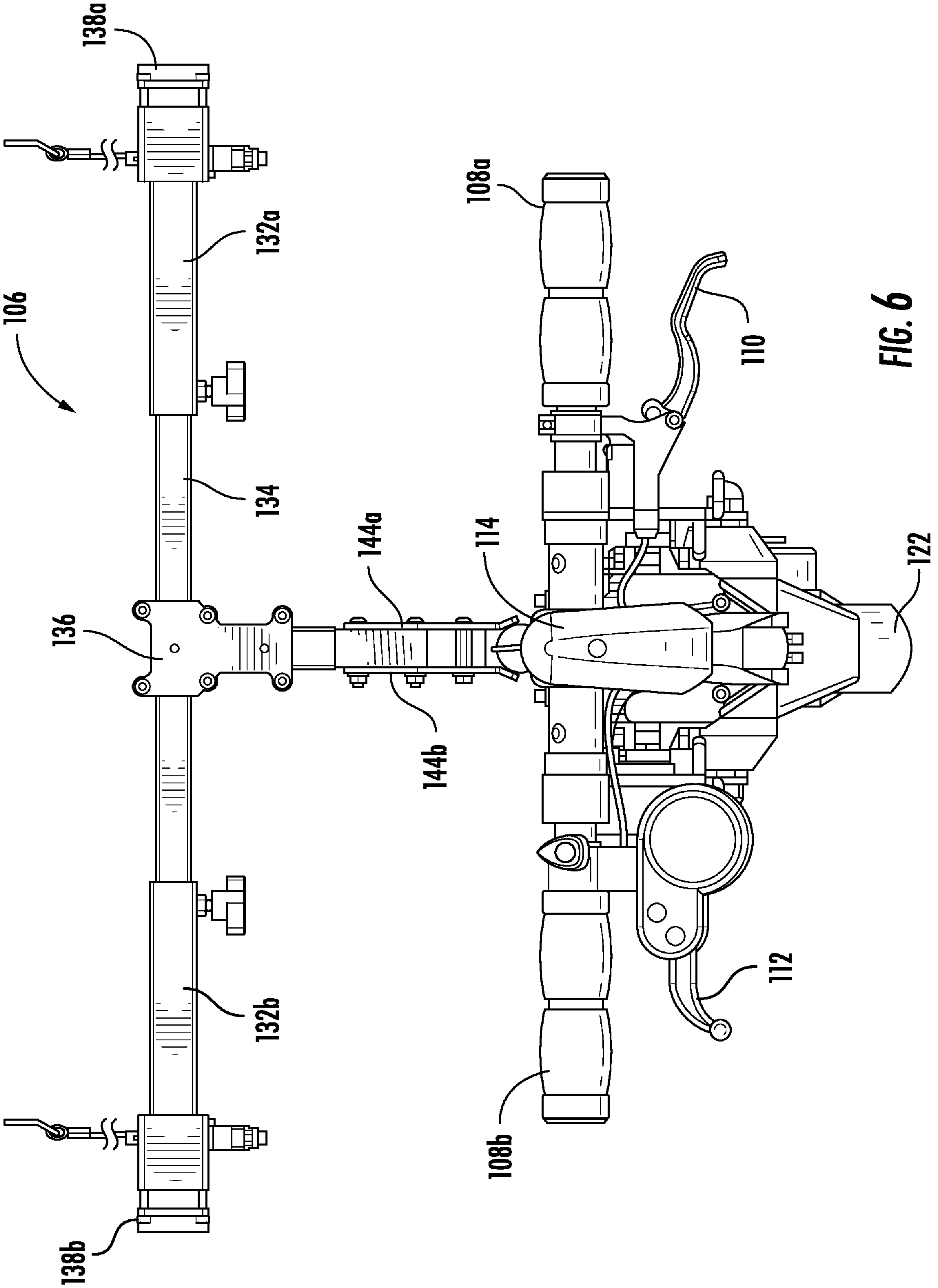
FIG. 6 is a top view of the motorized wheelchair accessory of FIG. 1.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Referring initially to FIGS. 1-6, various different view of the motorized wheelchair accessory 100 are depicted. In particular, a motorized accessory 100 is shown that is configured to be latched to a standard manual wheelchair in order to convert the manual wheelchair into a motorized wheelchair.

The motorized wheelchair accessory 100 includes a housing 116 having a top end and a bottom end. The housing 116 is generally orientated in a vertical position. A handlebar assembly 102 is secured to the top end of the housing 116, and a wheel assembly 104 is coupled to the lower end of the housing 116. A steering post 105 passes through the housing 116 and connects the handlebar assembly 102 to the wheel assembly 104. An electric motor 121 is coupled to the wheel assembly 104 and is configured to drive a wheel 122 of the wheel assembly.

A tow bar assembly 106 is used to couple the housing 116 to the wheelchair. The tow bar assembly 106 includes a proximal end that is coupled to the housing 116 and extends outward to a free distal end. The free distal end of the tow bar assembly 106 is configured to be removably coupled to the wheelchair as described below.

The handlebar assembly 102 also includes a first handgrip 108*a* and an opposing second handgrip 108*b* that are configured to be grasped by the user to turn the wheel assembly 104 similar to a bicycle. The handlebar assembly 102 also includes a brake lever 110 and a speed control lever 112. The brake lever 110 is similar to a bicycle brake lever and is easy to use by squeezing in order to apply the brake of a brake assembly 120. The brake assembly is coupled to the wheel 122.

The speed control lever 112 can be operated similarly by squeezing to increase the speed or released in order to reduce the speed. The handlebar assembly 102 may also include a headlight 114 that can be used to light a dark path, and to make the wheelchair more readily visible even in the daylight. The speed control lever 112 is configured for forward, neutral and reverse.

The motorized wheelchair accessory 100 includes an electric motor 121 that is used to drive the wheel 122. In a particular aspect, there is only a single wheel 122, which is advantageous in making the motorized wheelchair accessory 100 easy to steer and operate, as well as being lightweight. This feature is important in that the motorized wheelchair accessory 100 can be loaded and stored in a vehicle easier because it is lighter and easier to handle than a standard electric wheelchair, which is relatively heavy. The handgrips 108*a*, 108*b* are also configured to be folded downward for easy storage.

The electric motor 121 is coupled to a battery 115 within the housing 116 and is the power source to drive the wheel 122. The battery 115 is a rechargeable battery that is recharged periodically as needed. The battery 115 is also accessible within the housing 116 and can be replaced.

The motorized wheelchair accessory 100 may also include a kickstand 118 that is configured to support the housing 116 in an upright position when not coupled to the wheelchair. The kickstand 116 may be spring loaded and deploy automatically when the motorized wheelchair accessory 100 is decoupled from the wheelchair.

Figure 7:
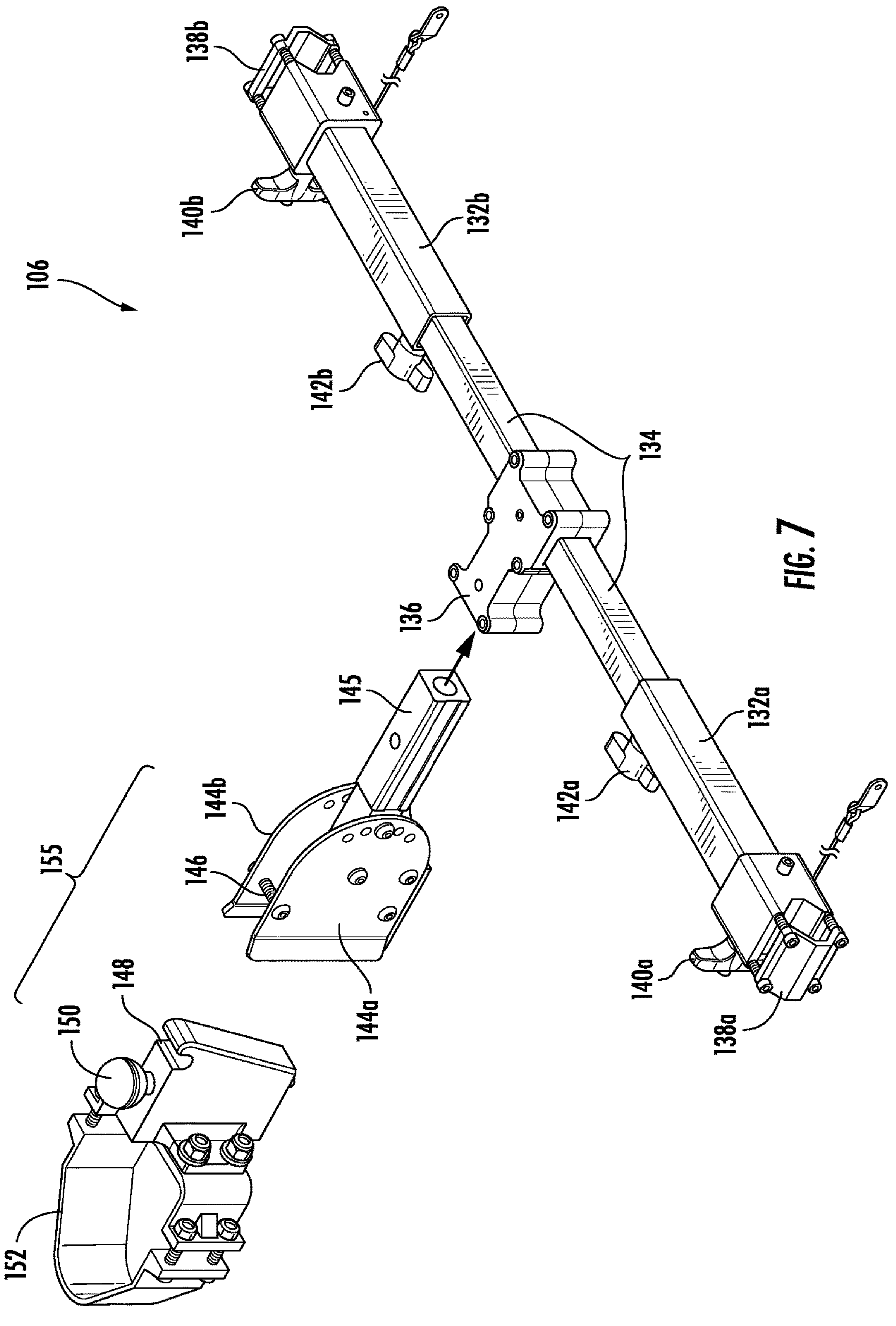
FIG. 7 is a perspective exploded view of a tow bar assembly of the motorized wheelchair accessory of FIG. 1.

Referring now to FIG. 7, an exploded view of the tow bar assembly 106 of the motorized wheelchair assembly 100 is depicted. The proximal end of the tow bar assembly 106 comprises a collar 152 to couple the tow bar assembly 106 to the housing 116. As those of ordinary skill in the art can appreciate, the collar 152 may comprise a plate or other mechanical faster to secure the housing 116 to the tow bar assembly 106. The distal end of the tow bar assembly 106 comprises a tow bar 134. The tow bar assembly 106 also includes a latch 155 to removably couple the proximal end and the distal end of the tow bar assembly 106 together. The latch 155 includes quick release handle 150 that is pulled in order to release the latch 155. The quick release handle 150 may be a t-handle or ball shape or any other shape as those of ordinary skill in the art can appreciate. The latch 155 also includes a pin 146 mounted between a pair of latch plates 144*a*, 144*b*. The pin 146 is adapted to be received within a groove 148 adjacent to the quick release handle 150. An insert tube 145 extends from the pair of latch plates 144*a*, 144*b* and is received within tow bar clamp 136. The angle of the tow bar 134 can be adjusted using the latch plates 144*a*, 144*b* that have a plurality of apertures in order to accommodate varying angles between the wheelchair and the motorized wheelchair accessory 100.

The tow bar clamp 136 is configured to secure a middle portion of the tow bar 134 to the latch 155. The tow bar 134 comprises a first free end and a second free end extending from the middle portion outward in opposite directions. Wheelchair clamps 138*a*, 138*b* are secured on each of the free ends. The wheelchair clamps 138*a*, 138*b* are configured to be secured to horizontal or vertical bars as explained below with respect to FIGS. 8 and 9. The tow bar assembly 106 also includes outer tow bar tubes 132*a*, 132*b*. The outer tow bar tubes 132*a*, 132*b* cooperate with the tow bar 134 to adjust an overall width of the tow bar assembly 106. This feature is important to adjust to different widths of manual wheelchairs that can be used with the motorized wheelchair accessory 100.

The overall width can be adjusted using adjustment handles 142*a*, 142*b*. In operation, the adjustment handles 142*a*, 142*b* can be loosened so that the outer tow bar tubes 132*a*, 132*b* can be slid inward or outward over the tow bar 134 to reach the desired overall width. Once the desired width is reached, the adjustment handles 142*a*, 142*b* can be tightened back down to hold the desired width.

As explained above, the wheelchair clamps 138*a*, 138*b* are configured to be secured to the wheelchair so that the motorized wheelchair accessory 100 can tow the wheelchair. Quick release handles 140*a*, 140*b* are used to quickly secure the respective wheelchair clamp 138*a*, 138*b* to the wheelchair. Likewise, the quick release handles 140*a*, 140*b* are used to release the wheelchair clamps 138*a*, 138*b* so that the tow bar assembly 106 can be completely removed from the wheelchair as needed.

Figure 8:
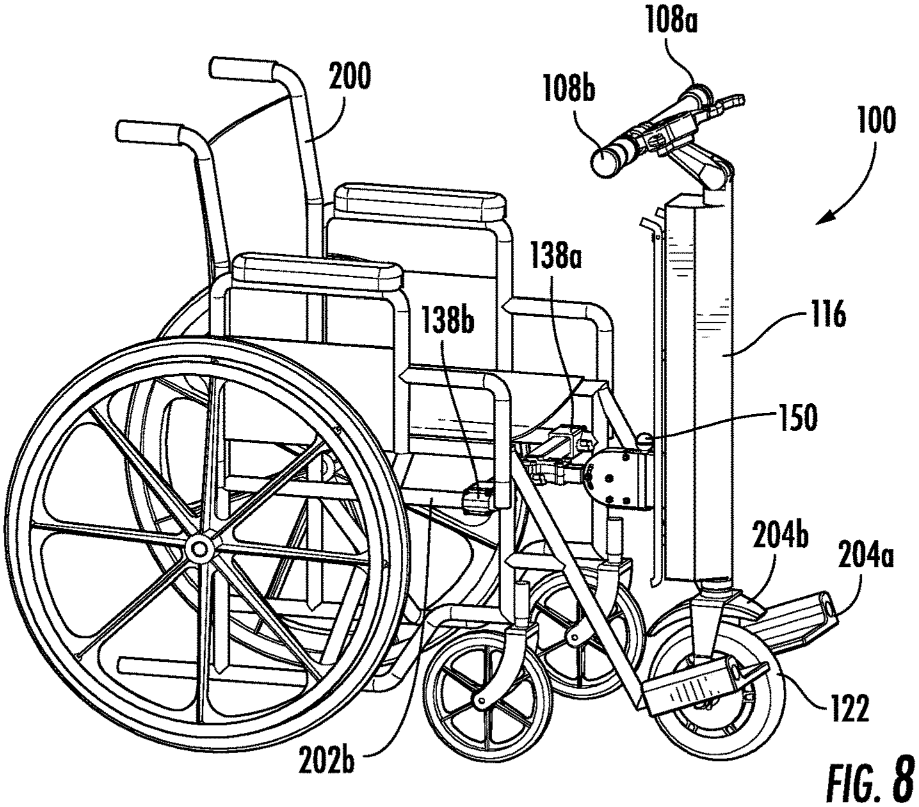
FIG. 8 is a right side elevational view of the motorized wheelchair accessory latched to a manually driven wheelchair.
Figure 9:
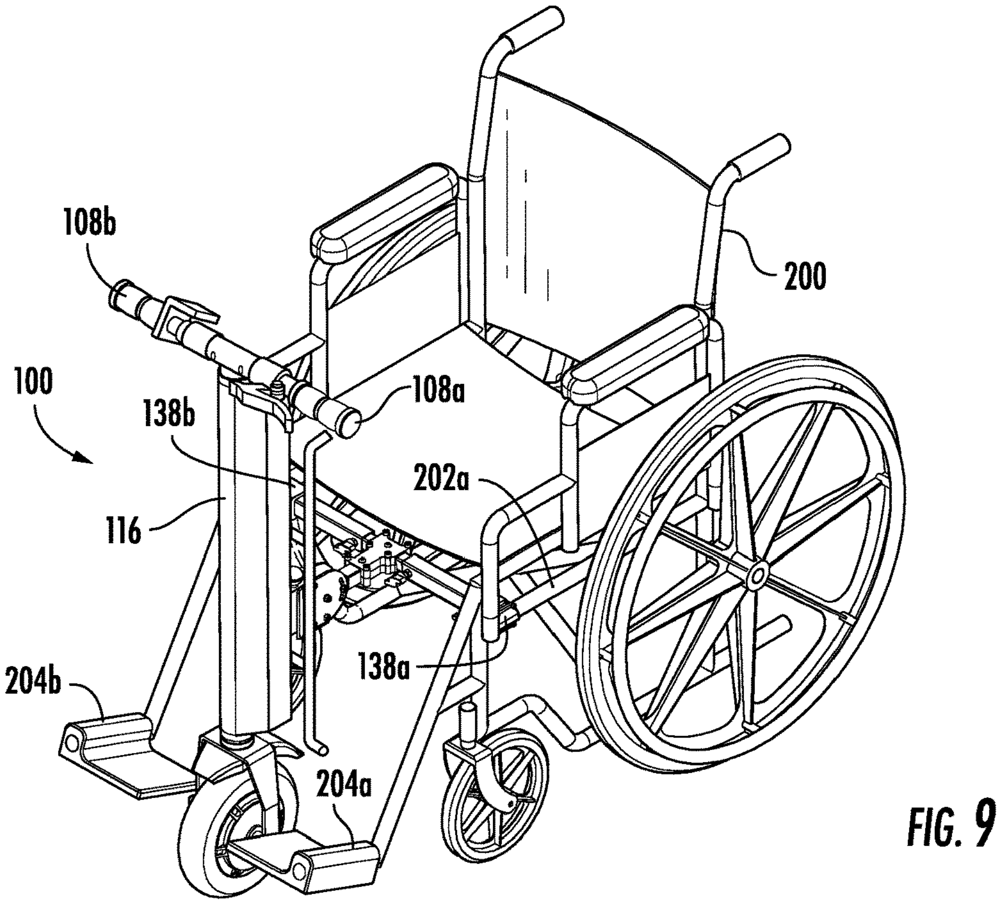
FIG. 9 is a detail left side view of the motorized wheelchair accessory latched to the manually driven wheelchair.

Referring now to FIGS. 8 and 9, a particular aspect of the motorized wheelchair accessory 100 is shown mounted to a typical manual wheelchair 200. The wheelchair 200 has frame tubes 202*a*, 202*b* that are used to attach the tow bar 134 using the respective wheelchair clamps 138*a*, 138*b*. The housing 116 is positioned in front of the wheelchair and generally in the center. The person sitting in the wheelchair 200 will have a leg on either side of the housing 116 and with their feet in the appropriate foot rests 204*a*, 204*b*.

In operation, the user leans slightly forward and grasps the handgrips 108*a*, 108*b*. The user can then squeeze the speed control lever and the wheel 122 will be driven forward pulling the wheelchair 200. The tow bar assembly 106 is adjustable and allows for 16" to 24" wheelchair widths.

Accordingly, the motorized wheelchair accessory 100 can be used to convert any manual wheelchair 200 into a motorized electrically driven wheelchair.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A motorized accessory for a wheelchair comprising:

a housing having a top end and a bottom end;

a handlebar assembly secured to the top end of the housing, the handlebar assembly having a first handgrip and an opposing second handgrip that are configured to be grasped by a user;

a wheel assembly coupled to the lower end of the housing and configured to be turned by the handlebar assembly;

an electric motor coupled to the wheel assembly and configured to drive the wheel assembly;

a tow bar assembly having a proximal end coupled to the housing and extending outward to a free distal end, wherein the free distal end is configured to be removably coupled to the wheelchair;

a speed control lever mounted to the first handgrip to control the electric motor; and and a brake lever mounted to the second handgrip to control braking of the wheel assembly and separate from the speed control lever.

2. The motorized accessory of claim 1, wherein the wheel assembly comprises a single wheel.

3. The motorized accessory of claim 1, further comprising a battery within the housing and coupled to the electric motor.

4. The motorized accessory of claim 1, wherein the wheel assembly comprises a brake assembly.

5. The motorized accessory of claim 1, further comprising a kickstand configured to support the housing in an upright position when not coupled to the wheelchair.

6. The motorized accessory of claim 1, wherein the proximal end of the tow bar assembly comprises a collar to couple the tow bar assembly to the housing.

7. The motorized accessory of claim 6, wherein the distal end of the tow bar assembly comprises a tow bar.

8. The motorized accessory of claim 7, wherein the tow bar assembly comprises a latch removably coupling the proximal end and the distal end of the tow bar assembly together.

9. The motorized accessory of claim 8, wherein the tow bar assembly comprises a clamp to secure a middle portion of the tow bar to the latch.

10. The motorized assembly of claim 9, wherein the tow bar comprises a first free end and a second free end extending from the middle portion outward in opposite directions and having a wheelchair clamp on each of the free ends.

11. The motorized assembly of claim 10, wherein the wheelchair clamps are configured to be secured to the wheelchair so that the motorized accessory can tow the wheelchair.

12. A motorized accessory for a wheelchair comprising:

a housing having a top end and a bottom end;

a handlebar assembly secured to the top end of the housing, the handlebar assembly having a first handgrip and an opposing second handgrip that are configured to be grasped by a user;

a wheel assembly coupled to the lower end of the housing and having a single wheel;

an electric motor coupled to the wheel assembly and configured to drive the wheel assembly;

a tow bar assembly having a collar coupled to the housing and a laterally positioned tow bar, wherein the tow bar is configured to be removably coupled to the wheelchair;

a speed control lever mounted to the first handgrip to control the electric motor; and and a brake lever mounted to the second handgrip to control braking of the wheel assembly and separate from the speed control lever.

13. The motorized accessory of claim 12, wherein the tow bar assembly comprises a latch removably coupling the collar and the tow bar together.

14. The motorized assembly of claim 12, wherein the tow bar comprises a first free end and a second free end extending from a middle portion outward in opposite directions and having a wheelchair clamp on each of the free ends.

15. The motorized accessory of claim 12, further comprising a battery within the housing and coupled to the electric motor.

16. A motorized accessory for a wheelchair comprising:

a housing having a top end and a bottom end;

a handlebar assembly secured to the top end of the housing and having a first handgrip and an opposing second handgrip that are configured to be grasped by a user to turn the wheel assembly;

a wheel assembly coupled to the lower end of the housing;

an electric motor coupled to the wheel assembly and configured to drive the wheel assembly;

a speed control lever mounted to the first handgrip and a brake lever secured to the second handgrip of the handlebar assembly and configured to control an operation of the wheel assembly; and a tow bar assembly having a proximal end coupled to the housing and extending outward to a free distal end, wherein the free distal end is configured to be removably coupled to the wheelchair.

17. The motorized accessory of claim 16, further comprising a battery within the housing and coupled to the electric motor.

* * * * *